June 23, 1931.  G. M. SMITH  1,811,678
METHOD OF MAKING CIRCUMFERENTIALLY CORRUGATED SHEET METAL PIPE
Filed July 27, 1928
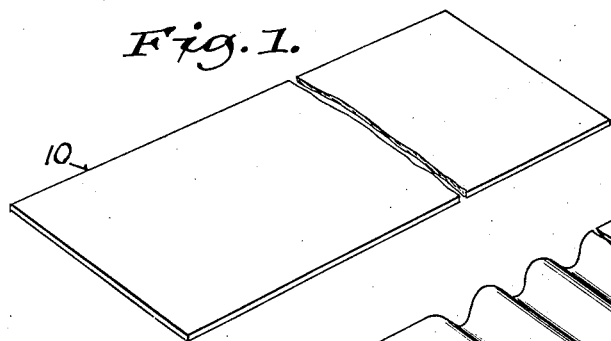
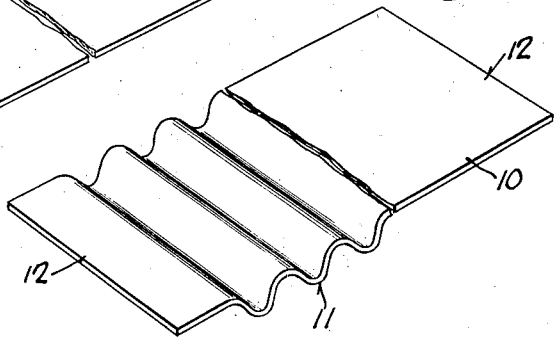
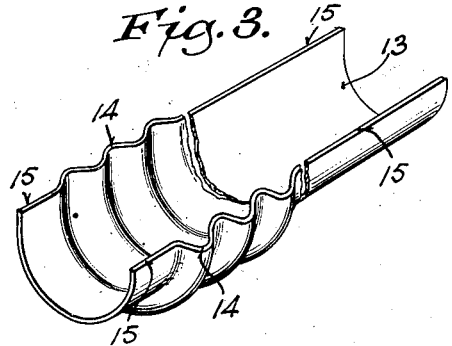
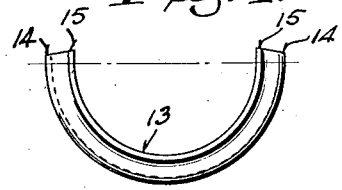
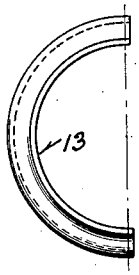
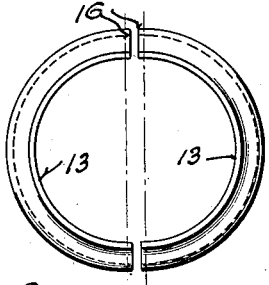
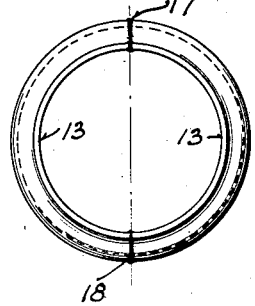
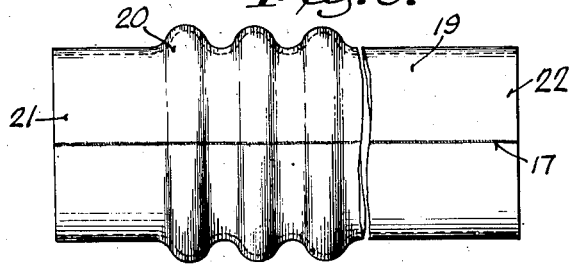
INVENTOR.
GEORGE M. SMITH
BY
ATTORNEY.

Patented June 23, 1931

1,811,678

UNITED STATES PATENT OFFICE

GEORGE M. SMITH, OF MILWAUKEE, WISCONSIN, ASSIGNOR TO A. O. SMITH CORPORATION, OF MILWAUKEE, WISCONSIN, A CORPORATION OF NEW YORK

METHOD OF MAKING CIRCUMFERENTIALLY CORRUGATED SHEET METAL PIPE

Application filed July 27, 1928. Serial No. 295,711.

The present invention relates to a method of making welded circumferentially corrugated sheet metal pipes.

The invention resides in a method of making a pipe constituted of a transversely corrugated metal plate or plates or sheets, each of which after corrugation is bent into a curved or trough-like section on lines crossing the corrugations, the curved or trough-like sections being welded in the lines of their meeting edges into an integral tubular structure.

It resides also in a ·ies of novel operations, which are performed in such succession as to greatly facilitate and expedite the production of pipe of this character. At the same time, many of the difficulties which existed heretofore in making of pipe of like nature are overcome by the use of the present invention.

In its preferred embodiment, the simplest to manufacture, my invention comprises two transversely corrugated half-shells or trough-like sections of plate or sheet metal, which are electrically welded on their opposite longitudinal meeting edges into an integral, tubular structure.

In carrying out my preferred method, I take a metal plate, usually rectangular, having a width a little in excess of one-half of the circumference of the pipe which it is desired to produce, and of any suitable length for the purposes of the invention. The selected metal plate is first subjected to the action of the dies of a drawing press, in which it is corrugated transversely. The corrugated plate is then placed between the dies of a second drawing press, which will bend the plate on lines crossing the corrugations at a right angle, so as to produce a curved, half-shell or trough-like section, corrugated transversely. A second like plate is treated in the same manner. Two of such sections are then assembled in the form of a tube, with their meeting edges aligned and the corrugations in register, and the sections are then electrically welded along such meeting edges to produce an integral pipe provided with corrugations extending about the circumference thereof.

Having thus stated the general nature and purposes of my invention, I will now describe the production of the same specifically, and point out the novelty thereof in the appended claims.

In the accompanying drawings:

Figure 1 is a perspective view of a rectangular metal blank of suitable proportions, such as I use in practicing my invention, the view being broken out centrally.

Fig. 2 is a like view of the same blank after it has been corrugated transversely in the first drawing operation.

Fig. 3 is a like view of the corrugated blank after it has been subjected to the action of the dies of another drawing press to convert the transversely corrugated blank into the corrugated half-shell or trough-like section, in the second drawing operation.

Fig. 4 is an end view of the half-shell or trough section as it appears at the completion of the second drawing operation, and showing uneven edges produced in drawing.

Fig. 5 is an end view of the shell or trough section after its uneven edges have been trimmed and squared or faced so as to lie in the same diametral plane.

Fig. 6 shows the near essembly of two finished complemental sections, produced as in Fig. 5.

Fig. 7 is an end view of the circumferentially corrugated pipe, completed by welding the squared meeting edges.

Fig. 8 is a view in elevation of the completed pipe produced in accordance with my invention, the view being broken out intermediate its ends.

In the drawings, the numeral 10 indicates a flat metal plate or sheet of appropriate length and of a width which is a little greater than one-half of the projected circumference of the pipe to be produced. The excess of width provides for a marginal trimming, as hereinafter described. The plate 10 is subjected to the action of the dies of a drawing press, which are arranged so as to corrugate the metal plate in the direction of its width, and produce transverse corrugations 11, leaving the ends 12, 12, of the plate in the original undisturbed plane from which the corrugations are displaced at one side of the plate. The corrugated plate is then subjected to the action of the dies of a second drawing press so as to bend the plate across the corrugations at a right angle, or in the direction of the length of the pipe, and thus convert the latter into a half-shell or trough-like section 13.

In bending the corrugated plate across its corrugations 11, the more distant edges 14, 14, of the corrugated portion are distorted from the plane in which the plain edges 15, 15, of the uncorrugated ends 12 lie in the half-shell or trough-like section. This result is due to the longer radius and the greater outward displacement of the metal in the distant edges of the corrugations. In the construction thus produced, the edges in the corrugated section tend to diverge from a common plane, so that in assembling two of such sections 13, 13, in a tube with an edge to edge contact, the serpentine edges cannot be brought into contact at the points of largest diameter of the pipe, by reason of the diverging planes in which such edges lie.

To overcome this objection, I shear a longitudinal strip from each side margin of the half-shell or trough-like section, and make the cut in the plane of what is practically the greatest diameter of the pipe. When two of such half-shell sections with their edges so trimmed are brought into conjunction, all of the surface of the edges will lie in the same plane, so as to permit a complete electrical contact, as indicated at 16, in Fig. 6.

With two of the half-shell or trough-like sections 13 assembled in edge to edge contact as described, the edges are then welded along their meeting lines as at 17 and 18, to unite such shells or sections into an integral tubular structure 19, provided with circumferential corrugations 20, between the plain ends 21, 22, of the pipe.

The best results in welding are secured by using an electric current for heating the edges and bringing them to a welding temperature. The welding may be either by arc or resistance. But a flame may be used for welding the meeting edges.

Although I have described my preferred construction as being formed of two sections, my invention is not to be so limited, and it will be within the scope of the invention to construct the pipe of one or any plural number of plates, as may be expedient. And while electric resistance welding is preferred, arc welding and flame welding are declared by me to be equivalent for the purposes of my invention, in uniting the aligned and abutted meeting edges.

The circumferentially corrugated pipe produced in accordance with my invention is susceptible of many uses. The formation of the corrugations 20 is so proportioned that the pipe will have capacity for expansion or contraction under the different conditions which may attend its use. The corrugations should not be permitted to encroach upon the normal diameter of the pipe, or have any arrangement which would interfere with the free flow of fluid therethrough.

Having thus described my invention, what I claim and desire to secure by Letters Patent of the United States, is:

1. The method of making circumferentially corrugated sheet metal pipe, which consists in corrugating a metal plate transversely between its plain ends, bending the plate on lines crossing the corrugations to form a curved section, aligning and abutting the corrugated edges with others of like formation, and welding the aligned and abutted edges and the plain edges together on a line extending in the direction of the length of the pipe.

2. The method of making circumferentially corrugated, longitudinally expansible, sheet metal pipe, which consists in corrugating a metal plate transversely between its plain ends, bending the plate on lines crossing the corrugations to form a half-shell or trough-like section, assembling two of such sections with their edges aligned and abutted to form a tube, and welding the meeting edges of the sections together on lines extending in the direction of the length of the pipe, to constitute an integral structure.

3. A method of making circumferentially corrugated sheet metal pipe which comprises corrugating a metal plate transversely intermediate the ends thereof, bending the plate transversely to said corrugations to form a curved section, trimming the longitudinal edges of said curved section, aligning and abutting the longitudinal edges of said section with longitudinal edges of a similar section, and welding the aligned edges together.

4. In the method of making circumferentially corrugated sheet metal pipe, the steps comprising corrugating a metal plate transversely between its plain ends, bending the plate on lines crossing the corrugations to form a curved section, aligning and abutting one corrugated edge with another of like formation to provide a tubular section, and finally welding the aligned and abutted longitudinally extending edges of the section together.

In testimony whereof, I have signed my name at Milwaukee, this 25th day of July, 1928.

GEO. M. SMITH.